Patented Mar. 26, 1946

2,397,195

UNITED STATES PATENT OFFICE 2,397,195

HEAT ABSORBING GLASS

Glenn C. Mook and Richard W. Ricker, Toledo, Ohio, assignors to Libbey-Owens-Ford Glass Company, Toledo, Ohio, a corporation of Ohio No Drawing. Application January 9, 1941, Serial No. 373,804

1 Claim. (Cl. 106—54)

Our invention relates to improvements in transparent heat absorbing glasses.

Glasses for absorbing radiant heat and which have a relatively high light transmission are well known. Most commercial heat absorbing glasses depend on the use of iron oxide for bringing about the absorption of heat. Iron oxide dissolved in glass can exist in two "states," both of which impart color to glass. For instance, the iron oxide may be present in the form of ferrous oxide, which gives a bluish tint to the glass and is a good heat absorber, or it may consist of ferric oxide, which gives a yellowish tint to the glass and is a less efficient heat absorber. The green tint of ordinary plate and window glasses comes from a mixture of bluish ferrous oxide and yellowish ferric oxide. However, the amount of iron oxide in the usual plate and window glasses is not enough to classify these glasses as heat absorbing.

The efficiency of heat absorbing glasses depends primarily on the relative amounts of heat and light transmitted by the glass, it being of course desirable that the glass transmit as much visible radiation as is possible, while at the same time absorbing as much total radiation as is possible. By "total radiation" is meant the heat or energy from the entire spectrum which includes the infra-red, visible and ultra-violet portions. Since the addition of iron oxide also adds color to glass there must be in heat absorbing glasses a higher ratio between the visible transmission and the total radiation transmission than in ordinary plate and window glasses. In other words, it is desirable to have as high a percent of visible transmission as possible, coupled with as low a percent of total radiation transmission as possible, and the higher the ratio between these two the greater the efficiency of the glass.

In carrying out our invention, we take a soda-lime-silica batch which consists substantially of a plate or window glass batch and to this basic batch add the desired substances or compounds, including iron oxide, to give a heat absorbing glass. We have discovered that if a halogen, such as chlorine or fluorine or both, is added to a basic soda-lime-silica batch, along with iron oxide, in predetermined amounts a glass having improved heat absorbing qualities is obtained as well as one having a greater efficiency ratio value between the percent of visible transmission and the percent of total radiation transmission. In other words, the addition of the chlorine and/or fluorine to the glass batch reacts with the other ingredients and greatly improves the heat absorbing properties of the glass over a similar glass containing the same amount of iron oxide but in which the chlorine and/or fluorine are omitted. Of the halogen group (fluorine, chlorine, bromine and iodine), we prefer to use fluorine and chlorine because the sources of these materials (chlorides and fluorides) are cheaper and easier to use. However, the halogen may be introduced into the glass batch by means of the alkali metal bromides and iodides or halogen salts of other elements.

The chlorine is preferably added to the batch in the form of sodium chloride (salt), while the fluorine can be added as calcium fluoride (fluorspar). We are aware that it has heretofore been proposed to introduce chlorine and fluorine into glass batches as an aid to melting and refining, but insofar as we are aware these compounds have never been employed in the manufacture of heat absorbing glasses for the purpose of increasing or improving the heat absorbing qualities of the glass.

It is also known that if the amount of chloride in a glass batch is too great seeds will be formed, while an excess of fluoride will cause opalescence. However, we have found that by maintaining these ingredients within certain definite limits it is possible to produce a soda-lime-silica heat absorbing glass of a quality comparable with ordinary plate or window glass but having a relatively high efficiency ratio between the percent of visible transmission and the percent of total radiation transmission. We have also discovered that the halogens affect infra-red absorption of glass containing iron oxide.

In the manufacture of heat absorbing glasses, efforts are made to keep as much as possible of the iron oxide in the ferrous state and, therefore, it is customary to add to the batch a reducing agent to obtain the necessary reduction of the iron to the ferrous state. For this purpose, we suggest the use of powdered charcoal, although carbon or any other well known reducer may be used. A relatively small amount of borax is also preferably added to the batch to soften the glass for easier melting.

By way of example and as illustrative of the invention, a typical soda-lime-silica glass batch which may be used for producing either window glass or plate glass is as follows:

| | Batch amount in parts |
|---|---|
| Sand | 1,000 |
| Limestone | 318 |
| Soda ash | 276 |
| Salt cake | 50 |
| Powdered charcoal | 3 |

In accordance with our invention, we employ a basic soda-lime-silica type of batch as set forth above and add thereto certain other ingredients to render the glass of a heat absorbing character without materially increasing its cost and also without impairing its quality or its melting and refining characteristics. More particularly, these added ingredients include the source of iron oxide, a metal halide consisting of sodium chloride or calcium fluoride or both, and borax. Typical heat absorbing glasses falling within the scope of this invention are as follows:

*Batch compositions*

|  | Batch | | | |
| --- | --- | --- | --- | --- |
|  | A | B | C | D |
| Sand | 1,000 | 1,000 | 1,000 | 1,000 |
| Limestone | 318 | 318 | 300 | 280 |
| Soda ash | 276 | 249 | 276 | 260 |
| Salt cake | 50 | 50 | 50 | 50 |
| Salt (sodium chloride) |  | 30 |  | 30 |
| Borax | 20 | 20 | 20 | 20 |
| Fluorspar (calcium fluoride) |  |  | 15 | 30 |
| Iron scale | 9.54 | 9.54 | 9.54 | 8.00 |
| Powdered charcoal | 5 | 5 | 5 | 5 |
| Per cent $Fe_2O_3$ in finished glass | .75 | .75 | .75 | .62 |

*Transmission measurements*

|  | A | B | C | D |  |
| --- | --- | --- | --- | --- | --- |
| Thickness of glass tested inches | ⅛ | ⅛ | ⅛ | ⅛ | ¼ |
| Transmissions: |  |  |  |  |  |
| Visible | 79.8 | 79.0 | 77.0 | 76.5 | 64.5 |
| Total radiation | 56.6 | 54.0 | 49.0 | 47.1 | 29.6 |
| Infra-red | 37.1 | 34.8 | 28.9 | 24.9 | 8.1 |
| "Efficiency ratio"= $\frac{Visible}{Total\ radiation}$ | 1.41 | 1.46 | 1.57 | 1.62 | 2.18 |

It will be noted that in the above batch examples iron scale was added to give the desired amount of iron oxide in the glass, but rouge or other suitable source of iron oxide may be used. In batches A, B, and C, an amount of iron was used to calculate approximately .75% $Fe_2O_3$ in the finished glass, whereas in batch D the percentage of $Fe_2O_3$ in the finished glass was .62%. The amount of iron oxide in the finished glass, however, may vary from 0.3% to 1.2%. Salt cake and borax decrease the efficiency of a heat absorbing glass, but it is desirable to use them to get glass free from silica scum and to aid in melting and refining. When adding the chlorine and fluorine in the form of sodium chloride and fluorspar, it is preferred that the amount of soda ash and limestone used be adjusted to compensate for the sodium and calcium which is introduced along with the chlorine and fluorine.

As pointed out above, we have discovered that the addition of chlorine and fluorine to a basic soda-lime-silica batch containing added iron results in a material improvement in the heat absorbing qualities of the glass and produces a glass having a greater efficiency ratio value between the visible transmission and total radiation transmission. Although it is preferred to include both the chlorine and the fluorine in the batch, either one may be advantageously used alone and results in a glass having better heat absorbing properties than if neither one were used. This is clearly shown by the above transmission measurements. Thus, ⅛ inch glass produced from batch A, which contained neither sodium chloride nor calcium fluoride, was found to have an efficiency ratio of 1.41. On the other hand, glass produced from batch B, containing sodium chloride but omitting the calcium fluoride, had an efficiency ratio of 1.46; glass produced from batch C, containing calcium fluoride but omitting the sodium chloride, had an efficiency ratio of 1.57; while glass produced from batch D, containing both sodium chloride and calcium fluoride, had an efficiency ratio of 1.62. The glass produced from batch D had an increased efficiency ratio, notwithstanding the fact that a smaller amount of iron scale was used in the batch reducing the percent of $Fe_2O_3$ in the finished glass, which clearly shows that the addition of the sodium chloride and calcium fluoride offset the smaller amount of iron oxide and resulted in a glass having a higher efficiency ratio than glasses produced from batches A, B, and C. Glass produced from batch D showed in ¼ inch thickness an efficiency ratio of 2.18.

The above transmission measurements were made with the following apparatus which was devised for comparing heat absorbing glasses of this type:

1. The source of radiation for the three types of measurements consisted of a Monoplane projection lamp operated at a color temperature of 2848° K±20°.

2. The visible transmission of the glass specimen was measured with a photronic cell equipped with a Viscor filter.

3. The total radiation (total heat) transmission was measured by using a thermocouple receiver and a polished Jena glass filter, BG17, 2.5 mm. thick.

4. The infra-red transmission was measured by using the thermocouple receiver and a polished Corning Sextant red glass, No. 255, 3.5 mm. thick.

We claim:

A transparent soda-lime-silica heat absorbing glass produced from a batch containing the following ingredients in approximately the proportions shown:

| | |
| --- | --- |
| Sand | 1,000 |
| Limestone | 280 |
| Soda ash | 260 |
| Salt cake | 50 |
| Salt (sodium chloride) | 30 |
| Borax | 20 |
| Fluorspar (calcium fluoride) | 30 |
| Iron scale | 8.00 |
| Powdered charcoal | 5 | and having an efficiency ratio between the percent of visible transmission and the percent of total radiation transmission of approximately 1.62 in a glass thickness of ⅛ inch.

GLENN C. MOOK.
RICHARD W. RICKER.